United States Patent [19]

Urban

[11] 4,234,547

[45] Nov. 18, 1980

[54] FLUE GAS TREATMENT

[75] Inventor: Peter Urban, Northbrook, Ill.

[73] Assignee: UOP Inc., Des Plaines, Ill.

[21] Appl. No.: 36,932

[22] Filed: May 7, 1979

[51] Int. Cl.$^3$ .............................................. C01B 17/00
[52] U.S. Cl. ..................................... 423/242; 423/326
[58] Field of Search ................... 423/242 A, 326, 118, 423/242 R

[56] References Cited

U.S. PATENT DOCUMENTS

| | | | |
|---|---|---|---|
| 2,088,281 | 7/1937 | Smith | 423/326 |
| 3,989,797 | 11/1976 | Brady et al. | 423/242 |
| 4,150,096 | 4/1979 | Nelms et al. | 423/242 |

FOREIGN PATENT DOCUMENTS 396969  8/1932  United Kingdom .................... 423/242

Primary Examiner—O. R. Vertiz
Assistant Examiner—Gregory A. Heller
Attorney, Agent, or Firm—James R. Hoatson, Jr.; Louis A. Morris; William H. Page, II

[57] ABSTRACT

A process for removing, by absorption, sulfur dioxide from a gaseous mixture such as a flue gas by scrubbing said mixture with an aqueous scrubbing liquor to which a solution of an alkaline reagent such as sodium carbonate is added to maintain alkalinity of the scrubbing liquor. The solution also has dissolved in it a quantity of silica which tends to precipitate when solution is added to the scrubbing liquor. The silica precipitated in this manner tends to form extremely hard solid deposits in the scrubbing device and associated equipment. If a finely divided solid material such as fly ash or solid material obtained from said scrubbing liquor is added to the alkaline reagent solution prior to its use in the process, the silica forms an agglomeration with the finely divided solid material upon the addition of the alkaline reagent solution to the scrubbing liquor rather than forming the deposits in the scrubbing device and associated equipment. This agglomeration may be circulated with the scrubbing liquor with minimum deleterious effect.

5 Claims, No Drawings

FLUE GAS TREATMENT

BACKGROUND OF THE INVENTION

1. Field of the Invention

The field of art to which the claimed invention pertains is liquid-gas absorptive separations. More specifically, the claimed invention relates to a process for the absorptive removal of sulfur dioxide from a gaseous mixture by means of a scrubbing liquor.

2. Description of the Prior Art

Due to the ever increasing concern about air pollution, great efforts have been expended in recent years toward the development of processes to reduce the pollutants introduced into the atmosphere from various industrial operations. One of the most onerous of these pollutants is sulfur dioxide which is present in the stacks of flue gases from various operations. For example, $SO_2$ is a primary pollutant released into the atmosphere in the production of sulfuric acid. Also, great quantities of $SO_2$ are produced and passed to the atmosphere in the generating of power, particularly where the fuel used is high in sulfur content.

It has long been known to the art to abate sulfur dioxide pollution of the atmosphere. The so-called "wet process" is probably the most commonly used process to accomplish such abatement. In the wet process the $SO_2$ containing gas mixture is contacted or "scrubbed" with water in which is dissolved or slurried a reagent, particularly an alkaline reagent, that chemically reacts with the $SO_2$, thus effecting the removal of the $SO_2$ from the gas mixture and incorporating the sulfur originally contained in the $SO_2$ into a non-volatile compound dissolved in the scrubbing water. The sulfur is ultimately removed from the system by the discarding of the scrubbing water in which it is contained, or by removal from the water by further processing.

The alkaline reagent perhaps best known to the art for use in the scrubbing solution for the above wet process is alkali metal carbonate or bicarbonate. The alkali metal carbonate or bicarbonate reacts with the $SO_2$ to yield alkali metal sulfite or bisulfite and $CO_2$. Use of the alkali metal carbonate and specifically sodium carbonate or bicarbonate is particularly advantageous because solutions of that compound are commonly available as an adundant mineral deposit (Trona) occurring in the western part of the United States, and as process-waste streams from industries such as metals production, textile and paper making. The use of such streams not only cuts operating costs but also permits economies in the capital costs of wet processes because it eliminates the need for equipment to store and mix reagents obtained from other sources. Examples of prior art wet $SO_2$ scrubbing processes which utilize alkali metal carbonates are taught or claimed in U.S. Pat. Nos. 3,962,410; 3,963,825; 3,972,980; 3,984,529; and 3,987,147.

I have observed that certain inexpensive sources of sodium carbonate or bicarbonate (soda liquor), such as that produced as a by-product from the production of commercial grade sodium carbonate, contain quantities of silica which, when the soda liquor is used in the wet scrubbing process, precipitate and form deposits on the internals of the scrubbing apparatus. These deposits, which are extremely hard solids, interfere with the operation of the apparatus by eventually plugging the pipes and liquid circulating means which are a part of the apparatus. There is no practical way of removing these deposits.

I have found a means of minimizing the deleterious effects of the presence of silica in the alkali reagent used in the wet $SO_2$ scrubbing process.

SUMMARY OF THE INVENTION

It is, accordingly, a broad objective of my invention to provide an improvement to a process for the absorptive removal of sulfur dioxide from a gaseous mixture by minimizing the deleterious effects of silica present in the scrubbing liquor used in the process.

In brief summary, my invention is a process for the absorptive removal of sulfur dioxide from a gaseous mixture by contacting the gaseous mixture in a scrubbing zone with a scrubbing liquor which comprises a buffered solution of an alkali metal sulfite and bisulfite. The alkalinity of the scrubbing liquor is maintained by adding to it an aqueous alkaline reagent solution having a relatively high pH with respect to the scrubbing liquor. The aqueous alkaline reagent solution has dissolved in it a undesirable quantity of silica contaminant which, upon the addition of the aqueous alkaline reagent solution to the scrubbing liquor tends to precipitate from solution and form deleterious deposits. These deposits interfere with the functioning of the process. The improvement to the process comprises the addition of particles finely divided solid material to the aqueous alkaline reagent solution prior to the addition of the aqueous alkaline reagent solution to the scrubbing liquor. This effects the formation of an agglomeration of a precipitate of silica contaminant with the particles upon the addition of said alkaline reagent solution to said scrubbing liquor. This agglomeration has a minimum deleterious effect and relatively minor interference with the functioning of the process.

Other objectives and embodiments of my invention encompass details about feed mixtures and scrubbing liquors, all of which are hereinafter disclosed in the following discussion of each of the facets of the present invention.

DESCRIPTION OF THE INVENTION

Sulfur dioxide included in a gaseous mixture, such as a flue gas, may be dissolved out of the gas in a scrubber by means of an aqueous alkaline reagent solution. The alkaline reagent used in the process of my invention is preferably alkali metal carbonate and bicarbonate and most preferably sodium carbonate and bicarbonate. The overall reaction that occurs when the sodium carbonate or bicarbonate is used is:

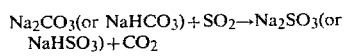

The $Na_2SO_3$ and $NaHSO_3$ are non-volatile and hightly water soluble, thereby effectively precluding the possibility of reintroduction of the sulfur into the gaseous mixture in any form.

The typical inexpensive soda liquor source comprises a waste stream or by-product of a wide variety of industrial processes, such as the process for the mining of soda ash. These sources, particularly if obtained from the process for the mining of soda ash, frequently contain an undesirable quantity of silica as a contaminant. The silica will be present in the high pH soda liquor in the form of water soluble sodium silicate having the formula $Na_2O \times SiO_2$, where x may be from 2 to 5.

The soda liquor obtained from the process for the mining of soda ash will contain about 30 wt. % sodium carbonate and about 1 wt. % silica calculated on the basis of silicon dioxide. The pH of this liquor will be about 11.5.

The typical flue gas scrubbing device comprises a vertically elongated chamber with means for introduction of the scrubbing liquor into the upper portion of the chamber and means for introduction of the flue gas into the lower portion. The liquor will be sprayed into the chamber and will flow downward through the chamber thereby coming into intimate contact with the up-flowing flue gas and thus enabling the absorption of the $SO_2$ from the flue gas into the liquor. The liquor drains out of the bottom of the chamber and is recirculated via pump and piping for reintroduction into the top portion of the chamber. A certain amount of the circulating liquor will be removed from the system and an amount of fresh alkaline reagent solution will be added to maintain the necessary alkalinity of the liquor.

The circulating scrubbing liquor will comprise a buffered solution of alkali metal sulfite and bisulfite having a pH from about 7.0 to about 8.0. The alkaline reagent solution which has a relatively high pH with respect to the scrubbing liquor, is added to the scrubbing liquor to maintain the pH of the scrubbing solution in the above range. The silica contained in the alkaline reagent solution will precipitate upon such addition due to insolubility of the silica in the scrubbing liquor at the relatively low pH of the scrubbing liquor. It is this precipitate which forms the aforementioned deleterious deposits on the internals of the scrubber and in the piping and associated equipment servicing the scrubber.

I have found that when particles of finely divided solid material, such as fly ash or solids obtained from the scrubbing liquor itself, are added to a silica containing alkaline reagent solution prior to the solution being added to the scrubbing liquor, the silica will precipitate and form an agglomerate with the solid material in the vicinity of where the alkaline reagent solution is introduced into the scrubbing liquor. The mechanism by which this agglomeration phenomena appears to work is that the individual particles of the finely divided solids act as nucleating sites on which precipitation of the silica occurs as the pH to which the silica is exposed is lowered, i.e. to about the pH of the scrubbing liquor. This precipitation will occur at the surfaces of the particles of the finely divided solid material, and agglomerates of these particles and precipitated silica will be formed in lieu of the deposits on the scrubber internals which would occur when the alkaline reagent solution is added to the scrubbing liquor in the absence of the alkaline reagent solution pre-treatment as taught by this invention. These agglomerates are relatively innocuous and can be circulated throughout the scrubber system without undue interference with the scrubbing operation. The agglomerates will eventually be removed from the system as part of the portions of the circulating scrubbing liquor which are from time to time removed from the system to allow for addition of alkaline reagent solution.

It is important that the solid material be added to the alkaline reagent solution in accordance with this invention as a pre-treatment prior to addition of the solution to the scrubbing liquor. The agglomerates of the silica and particles of solid material will form most effectively at high solid material concentration. A high concentration of solid material is easily achieved in the alkaline reagent solution as compared to the scrubbing liquor in view of the much smaller volume of the former stream. This high concentration will be substantially carried over to the vicinity of where the alkaline reagent solution is added to the scrubbing liquor and where the precipitation of the silica occurs due to the lowering of the pH to which it is exposed. Maintaining a solids concentration in the scrubbing liquor high enough to effectively cause the formation of agglomerates of the solid material with the precipitating silica, in lieu of adding the solids to the alkaline reagent solution in accordance with this invention, would make for an extremely inefficient process because of the requirement of expensive hardware, such as a slurry pump for circulating the scrubbing liquor, due to the erosive nature of a high solids concentration slurry, and because of the increased energy that would be required to circulate such a slurry.

The amount of the solid material added to the alkaline reagent solution is such that the weight ratio of the solid material, calculated on the basis of water wetted solid material, to silica contained in the alkaline reagent solution, calculated on the basis of silicon dioxide, is from about 5.0 to about 15.0.

The illustrative embodiment shown below is intended to further illustrate the process of this invention and is not to be construed as unduly limiting the scope and spirit of said process.

ILLUSTRATIVE EMBODIMENT

The following is illustrative of the results of the practice of the present invention on a laboratory scale $SO_2$ scrubber.

The scrubber vessel comprises a 1000 ml glass flask with a bottom drain fitting. Scrubbing liquor is passed through the drain fitting and flowed into tubing connecting the drain fitting to the inlet of a 1/12 HP seamless magnetic centrifugal pump. The pump recirculates the liquor via tubing through a stopper in the neck of the flask with the liquor discharging downward in the neck of the flask. Between the pump discharge and the flask are provisions for external heating of the tubing and withdrawal of circulating liquor. Fresh aqueous alkaline reagent solution, either treated or untreated with solid material in accordance with this invention, is introduced into the system at a point in the tubing between the flask and the inlet of the circulating pump, and a quantity of circulating liquor is removed via the above-mentioned withdrawal provision.

The $SO_2$ and air are each metered through rotameters and blended into a tube passing through the stopper in the flask and extending down into the flask to discharge through a sparger near the bottom of the flask. The gaseous mixture thus flows upward through the flask and comes into contact with the scrubbing liquor flowing downwardly through the flask. The portion of the gaseous mixture not absorbed is vented out of the flask through an opening in the stopper. All tubing used in the scrubber system is 10 mm ID glass.

Three aqueous alkaline reagent solutions are prepared. The first is the control sample and comprises a soda liquor comprising an aqueous solution of 30 wt. % sodium carbonate and 4100 parts per million by weight (ppm), calculated on the basis of elemental silicon, of silica diluted with a sufficient quantity of water to obtain a silicon concentration of 3200 ppm. The other two alkaline reagent solutions are the same as the first, except different types of particles of finely divided solid materials are added to each to obtain second and third sample alkaline reagent solutions having a silicon concentration of 3200 ppm and characterized as follows:

| Sample Number | Solid Material | Weight Ratio Water Wetted Solid Material To Silica |
|---|---|---|
| 2 | Scrubbing liquor solids | 11.40 |
| 3 | Fly ash | 12.56 |

The scrubbing liquor solids used for Sample No. 2 are obtained by centrifugal separation from a quantity of used scrubbing liquor. The solids acquired from the separation device is water washed and added to the alkaline reagent as a wet cake.

The Fly Ash used for Sample No. 3 is obtained by electrostatic precipitation from a flue gas emanating from a coal burning power generating facility. These solids are also added to the alkaline reagent as a wet cake.

Three test runs are made on the above scrubber system, each utilizing a different one of the above sample alkaline reagent solutions. The operating conditions of the scrubber system during all of the test runs is as follows:

SO$_2$ rate: 0.27 cubic ft./hr.
Air rate: 0.5 to 1 cubic ft./hr.
Recirculating scrubbing liquor temperature: 53°±3° C.
Velocity of recirculating scrubbing liquor in tubing: 2 to 3 ft./sec.

Following are the results of the test runs:

| Run and Sample No. | pH range | Observations |
|---|---|---|
| 1 | 7.4 to 7.6 | Hard unremovable, stone like deposits (2.347 grams) in scrubber system. |
| 2 | 7.3 to 7.6 | Clean tubes with loose gelatinous circulating material (0.0417 grams deposits). |
| 3 | 7.5 to 7.6 | Clean tubes with loose gelatinous circulating material (no measurable deposits). |

The advantages of the present invention are readily apparent from the above illustration. Without pre-treatment with a precipitating agent of particles of finely divided solid material, the use of silica-containing alkaline reagent solution would result in a buildup of hard deposits in the system that would eventually render it inoperative. The agglomerate formed by the addition of the precipitating agent is found to be innocuous.

I claim as my invention:

1. In a process for the absorptive removal of sulfur dioxide from a gaseous mixture by contacting said gaseous mixture in a scrubbing zone with a scrubbing liquor comprising a buffered solution of an alkali metal sulfite and bisulfite, the alkalinity of said scrubbing liquor being maintained by the addition thereto of an aqueous alkaline reagent solution comprising sodium carbonate or sodium bicarbonate having a relatively high ph with respect to said scrubbing liquor, said aqueous alkaline reagent solution having dissolved therein an undesirable quantity of silica contaminant which, upon the addition of said aqueous alkaline reagent solution to said scrubbing liquor tends to precipitate from solution and form deleterious deposits which interfere with the functioning of said process, the improvement which comprises the addition of particles of finely divided solid material comprising fly ash or solid material obtained from said scrubbing liquor or both to said aqueous alkaline reagent solution prior to the addition of said aqueous alkaline reagent solution to said scrubbing liquor thereby effecting the formation of an agglomeration of precipitate of silica contaminant with said particles upon the addition of said alkaline reagent solution to said scrubbing liquor, said agglomeration having a minimum deleterious effect and relatively minor interference with the functioning of said process.

2. The process of claim 1 further characterized in that said gaseous mixture comprises a flue gas.

3. The process of claim 1 further characterized in that said aqueous alkaline reagent solution comprises an aqueous solution having a pH of about 11.5 and containing about 30 wt. % sodium carbonate and about 1 wt. % silica calculated on the basis of silicon dioxide.

4. The process of claim 3 further characterized in that the pH of said scrubbing liquor may range from about 7.0 to about 8.0 during said contacting with said gaseous mixture.

5. The process of claim 1 further characterized in that the quantity of said finely divided solid material added to said alkaline reagent solution is such that the mole weight ratio of said solid material, calculated on the basis of water wetted solid material, to silica contained in said alkaline reagent solution, calculated on the basis of silicon dioxide, is from about 5.0 to about 15.0.

* * * * *